Figure 1:
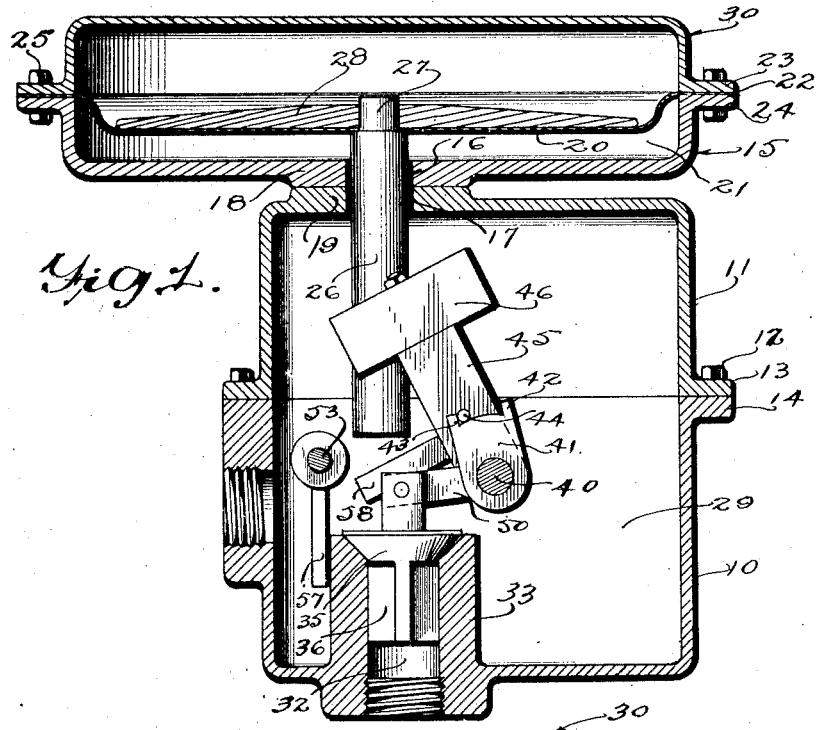

Aug. 14, 1928.　　　　　　　　　　　　　　　　1,681,041
C. E. KIMBROUGH
GAS CONTROL
Filed Oct. 4, 1927　　　　2 Sheets-Sheet 1

INVENTOR
C. E. KIMBROUGH
BY
Munn & Co.
ATTORNEY

Aug. 14, 1928.
C. E. KIMBROUGH
1,681,041
GAS CONTROL
Filed Oct. 4, 1927   2 Sheets-Sheet 2
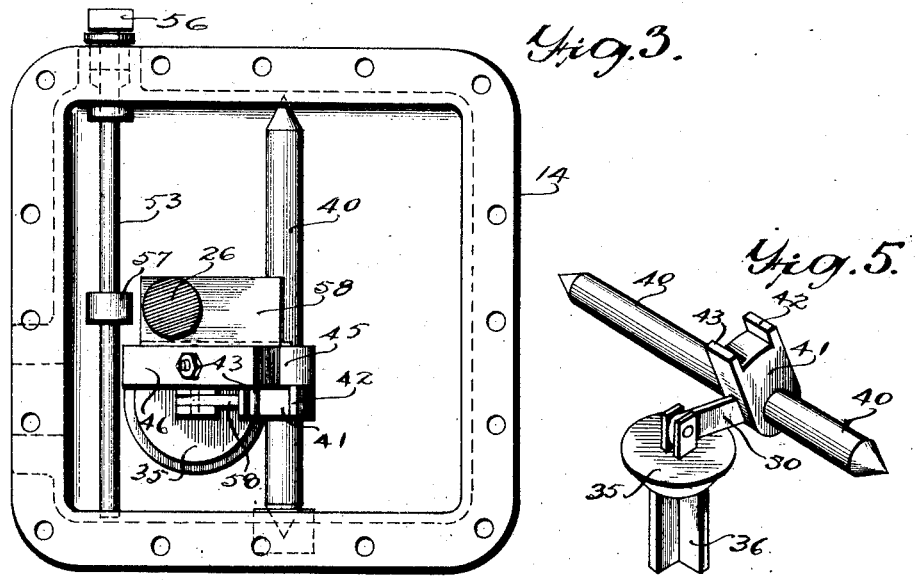
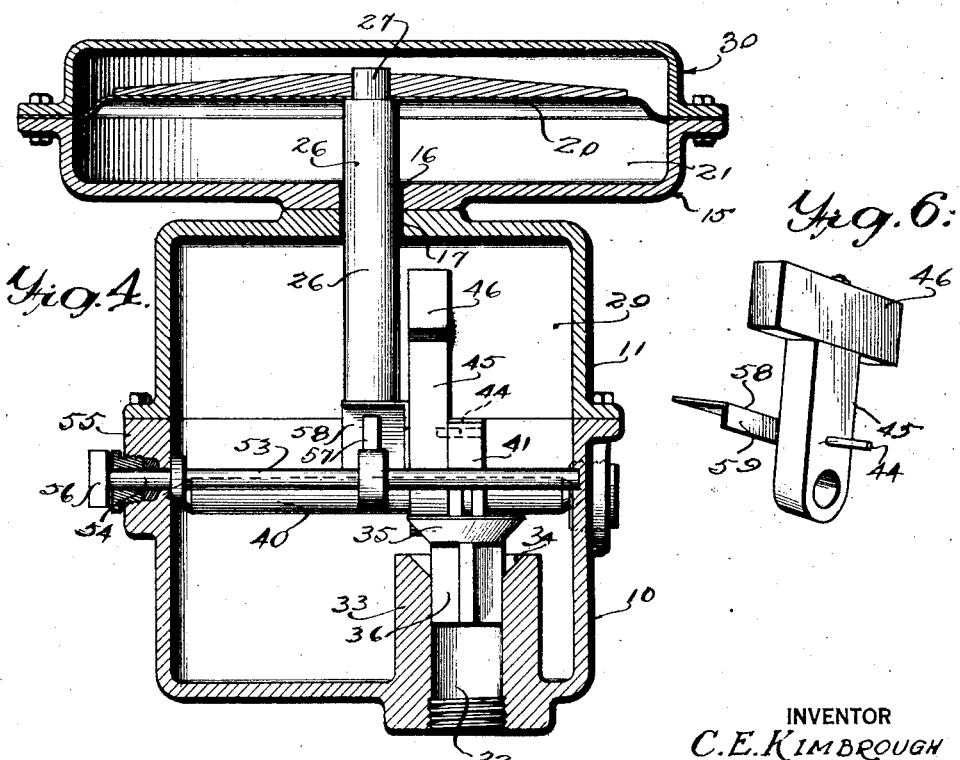
INVENTOR
C. E. KIMBROUGH
BY
ATTORNEY Patented Aug. 14, 1928.

1,681,041

UNITED STATES PATENT OFFICE.

CHARLES E. KIMBROUGH, OF HAYNESVILLE, LOUISIANA.

GAS CONTROL.

Application filed October 4, 1927. Serial No. 224,011.

This invention relates to a device for controlling the flow of gas under pressure through a pipe line.

It often becomes necessary either through accident or other causes to cut off all or part of the service lines of a gas system in order to make repairs where such repairs are required to be done immediately so that sufficient time is not had to notify the consumer of danger of cutting off the supply of gas to a stove or heater which are employed in homes, while the occupants are asleep or are unaware of the fact. Explosions occur in such instances where matches are lighted, or the sleeping occupants may be asphyxiated.

An object of the present invention is the provision of a valve which will operate automatically when the pressure of the gas in the system has been reduced, which will cut off the source of supply to the houses and thereby prevent escape of gas when the pressure has been sufficiently increased.

A further object of the invention is the provision of an automatically operated valve in a supply system of a gas line in a dwelling place or other building which will be maintained in an open position to permit the flow of gas when a predetermined pressure is maintained on the gas in the system, but which will automatically be moved to closing position when the pressure of the gas falls below a predetermined point, manual means being employed to reset the mechanism controlling the operation of the valve.

This invention will be best understood from a consideration of the following detailed description in connection with the accompanying drawings; nevertheless it is to be understood that the invention is not confined to the disclosure, but is susceptible of such changes and modifications which shall define no material departure from the salient features of the invention as described in the appended claims.

In the drawings:—

Figure 2:
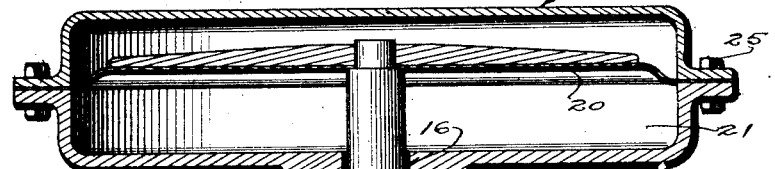
Figure 2:
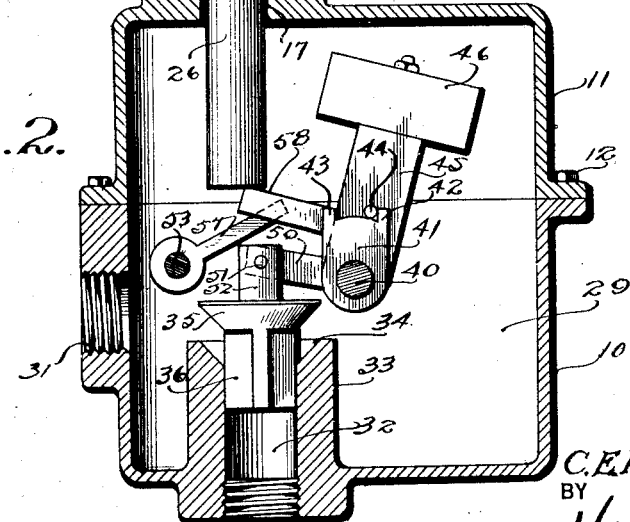

Figure 1 is a vertical section of the gas controlling device showing the valve in closed position, Figure 2 is a vertical section of the gas controlling device with the parts in operative position and the valve open, Figure 3 is a plan view of the gas controlling device, Figure 4 is a vertical section at right angles to the section shown in Figs. 1 and 2, Figure 5 is a view in perspective of one of the operating parts connected with the automatic valve, Figure 6 is a view in perspective of a weighting element aiding in operating the valve.

Referring more particularly to the drawings 10 designates a section of a housing which is adapted to be secured to a section 11 and the sections are secured together by means of bolts 12 passing through the flanges 13 and 14. A casing 15 likewise formed of two sections and bolted together is in restricted communication through the passages 16 and 17 respectively, formed in the bosses 18 and 19, the boss 19 being formed integrally with the section 11, while boss 18 is formed integrally with the housing 15.

A diaphragm 20 extends entirely across a chamber 21 formed in the housing 15 and the ends of the diaphragm, as shown at 22, are secured against movement by the annular flanges 23 and 24 at the periphery of the sections of the housing 15. The flanges are bolted together, as shown at 25. A plunger 26 has one end 27 secured to the diaphragm 20 and a reinforcing block 28 secured to the diaphragm with the reduced end 27 of the plunger 26 passing through said block. The plunger is guided longitudinally by the passages 16 and 17, respectively, located in the bosses 18 and 19, and these passages are of sufficient diameter to provide a space around the plunger 26 to permit gases from the chamber 29 to pass to the chamber 21 in the housing 15 to exert a pressure on the diaphragm 20 and normally maintain the plunger 26 in a normal inoperative position, as shown more particularly in Fig. 2, and when the diaphragm has been moved towards the top of the housing 15.

The section 10 of the chamber 29 is provided with an inlet 31 and an outlet 32, the outlet being provided in a hollow boss 33 which extends inwardly of the section 10 and projects for some distance into the chamber 29. The inner free end of the boss 33 is provided with a valve seat 34 adapted to be engaged by a valve 35 which has a guide member 36 formed of diametrically disposed bars which will permit gas to flow from the chamber 29 through the passage 32 when the valve 35 has been elevated.

An actuating means for closing the valve consists of a shaft 40 journaled in bearings in the opposite side walls of the section 10 and to which is secured a lug 41 having a pair of spaced ears 42 and 43 at the outer end thereof and adapted to be engaged by a pin 44. This pin is secured to an arm 45 which is pivotally mounted on the shaft 40 and has a weight 46 at the outer free end thereof which will tend to move the arm 45 upon opposite sides of the vertical passing through the axis of the shaft 40, as will be presently explained. Secured to the lug 41 is an arm 50 which is pivotally connected at 51 to a valve rod 52 secured to the valve 35.

A rock shaft 53 is mounted in bearings in the opposite side walls of the section 10 and has one end, shown at 54, projecting through a boss 55 on the section 10 and has an operating handle 56 whereby the shaft 53 may be rocked. A lever 57 is secured to a shaft 53 and is disposed below the lower free end of the plunger 26 and is adapted to be engaged by a lever 58 forming a tripping mechanism for rocking the arm 45 through the plunger 26. This tripping mechanism consists of a sheet metal plate having a depending flange 59 secured to one face of the arm 45.

The operation of my device is as follows:

As long as the gas is flowing at a predetermined pressure the gas is acting on the diaphragm 20 maintaining the plunger 26 in an upward position, as shown in Fig. 2, and the arm 45 is tilted towards the right, thereby maintaining the valve 35 in an upward open position. As soon as the gas pressure in the system falls for some reason the diaphragm 20 will return to its normal inoperative position, as shown in Fig. 1, thereby lowering the plunger 26 for acting upon the tripping mechanism 58 and forcing the same downwardly and rocking the arm 45 to the left, as shown in Fig. 1. The pin 44 then moves into engagement with the ear 43 rocking the lug 41 and shaft 30 and thereby causing valve 35 to be lowered and seated. In this manner the gas system to the home or other building is cut off, to prevent the gas escaping when the gas is turned on at full pressure, or at a predetermined pressure.

It will be necessary to actuate the manual means 56 thereby rocking the shaft 53 and elevating the lever 57 against the lever 58 thereby raising said lever and rocking the arm 45 to the position shown in Fig. 2. At this time the pin 44 moves into engagement with the ear 42 rocking the lug 41 and shaft 40 whereby the lever 50 will raise the valve 35 to position. If when this operation takes place it is noted that there is a resistance to the actuation of the member 56 for opening the valve 35, it will be appreciated that the pressure in the chambers 21 and 29 is not sufficient to actuate the diaphragm 20 for elevating the plunger 26 and the actuating member is then returned to its normal inoperative position, and should not be actuated until the resistance to the manual manipulation of the member 56 has been relieved by the gas pressure elevating the plunger 26 through its action upon the diaphragm 20.

I claim:—

1. A control for a gas system comprising a housing having an inlet and outlet for gas, a valve controlling the outlet, a shaft rockably mounted in the housing, a weighted arm pivotally mounted on the shaft, a lug rigid with the shaft, means connecting the lug with the arm, means under the control of gas pressure for rocking the arm, and means connecting the lug with the valve.

2. A control for a gas system comprising a housing having an inlet and outlet for gas, a valve controlling the outlet, a shaft rockably mounted in the housing, a weighted arm pivotally mounted on the shaft, a lug rigid with the shaft, means connecting the lug with the arm, a plunger, a lever connected with the arm and adapted to be engaged by the plunger for rocking the arm, a diaphragm acted on by gas pressure for maintaining the plunger in operative relation with the lever, and adapted to cause the plunger to actuate the lever when the gas pressure falls to a predetermined degree for rocking the arm and closing the valve.

3. A control for a gas system comprising a housing having an inlet and outlet for gas, a valve controlling the outlet, a shaft rockably mounted in the housing, a weighted arm pivotally mounted on the shaft, a lug rigid with the shaft, spaced ears at the end of the lug, a pin on the arm and adapted to alternately engage the ears whereby when the lug is rocked by the arm in one direction, the valve will be opened, means under the control of gas pressure for rocking the arm, and means connecting the lug with the valve.

Signed at Haynesville, in the parish of Claiborne and State of Louisiana this 30th day of Sept., A. D. 1927.

CHARLES E. KIMBROUGH.